US009836791B2

(12) United States Patent
Jensen et al.

(10) Patent No.: US 9,836,791 B2
(45) Date of Patent: Dec. 5, 2017

(54) SYSTEM FOR AND A METHOD OF TRANSMITTING DATA IN A CENTRAL TRADING SYSTEM

(75) Inventors: Daniel Jensen, Stockholm (SE); Tobias Hallor, Stockholm (SE)

(73) Assignee: Nasdaq Technology AB, Stockholm (SE)

( * ) Notice: Subject to any disclaimer, the term of this patent is extended or adjusted under 35 U.S.C. 154(b) by 1949 days.

(21) Appl. No.: 12/684,226

(22) Filed: Jan. 8, 2010

(65) Prior Publication Data

US 2011/0173113 A1 Jul. 14, 2011

(51) Int. Cl.
*G06Q 40/06* (2012.01)
*G06Q 40/04* (2012.01)

(52) U.S. Cl.
CPC ............ *G06Q 40/06* (2013.01); *G06Q 40/04* (2013.01)

(58) Field of Classification Search
USPC ...................................................... 705/35–45
See application file for complete search history.

(56) References Cited

U.S. PATENT DOCUMENTS

| 8,473,400 B1* | 6/2013 | May .................... G06Q 40/00 705/35 |
| 8,977,565 B2* | 3/2015 | Alderucci ............. G06Q 40/04 705/35 |
| 2005/0119964 A1* | 6/2005 | Brady et al. ................. 705/37 |
| 2011/0166982 A1* | 7/2011 | Cole .................... G06Q 40/04 705/37 |

\* cited by examiner

*Primary Examiner* — Bruce I Ebersman
(74) *Attorney, Agent, or Firm* — Nixon & Vanderhye P.C.

(57) ABSTRACT

A computerized trading system receives buy and sell trade orders in financial instruments traded in the central trading system from user terminals connected to the central trading system is provided. Users and/or user terminals are associated with different offset spread values. The trading system transmits price information and associated offset spread values to different user terminals. Each of the user terminals displays an actual price for the instrument that corresponds to the combined price information and associated offset spread value.

17 Claims, 2 Drawing Sheets

SYSTEM FOR AND A METHOD OF TRANSMITTING DATA IN A CENTRAL TRADING SYSTEM

TECHNICAL FIELD

The technology relates to a method and a device for transmitting data in a computerized central trading system.

BACKGROUND

Today it is very common that information is sent over computer networks. The amount of information being sent is rapidly increasing due to the advances in technology, making it possible to send and handle more information at higher speed. Furthermore, new applications demand a higher amount of information.

Example computer systems where data transmission is quite important include electronic trading systems. Today, electronic trading of securities, derivatives, commodities and other financial instruments involves large amounts of order transactions transmitted to and from users of the electronic trading system. Furthermore the users connected to a centralized automated electronic trading system require low latency in the access to the system. In some cases it may not be enough to simply boost the performance in the central system by for example updating the hardware in order to get rid of a bottleneck or other latency problem in the system.

Moreover, some electronic trading systems allow different types of users to access the system. For example a fixed income market implemented in an electronic trading system can be configured to allow both primary users and secondary users to trade in the same instruments. The electronic trading system can for example be configured to let a primary user trade at the true trading price whereas a secondary user is charged an extra fee when using the system. The fee can typically be charged by adding an amount such as a tick when trading in the system. It is also common that the secondary users are hindered from seeing the real prices in the market. Instead the price displayed is the price including the additional charge. The extra fee that will be charged to a secondary user will then be applied to each price distributed from the market.

Below is an Example:

The electronic trading system has three different types of firms acting in the system.

Firm P_A—Primary customer A, users from this firm will be allowed to see the real prices in the market.

Firm S_B: Secondary firm B, users from this firm will not be allowed to the see the real market. They will instead see prices with an additional spread of 1 price tick.

Firm S_C: Secondary firm C, users from this firm will not be allowed to the see the real market. They will instead see prices with an additional spread of 2 price ticks.

Security Y is traded with a price tick step size of 0.5.
The Real Market Prices are:

| Bid size | Bid | Offer | Offer size |
|---|---|---|---|
| 3 | 100.0 | 101.0 | 5 |
| 2 | 100.0 | 101.5 | 7 |
| 10 | 99.5 | 102.0 | 2 |

This will be the price picture displayed to users connected to customer P_A.

Based on the extra fee configuration the following view of the market for should be displayed to:
Customer S_B:—Additional Spread=1 pt=+/−0.5:

| B. size | Bid | Offer | O. size |
|---|---|---|---|
| 3 | 99.5 | 101.5 | 5 |
| 2 | 99.5 | 102.0 | 7 |
| 10 | 99.0 | 102.5 | 2 |

Customer S_C:—Additional Spread=2 pt=+/−1.0:

| B. size | Bid | Offer | O. size |
|---|---|---|---|
| 3 | 99.0 | 102.0 | 5 |
| 2 | 99.0 | 102.5 | 7 |
| 10 | 98.5 | 103.0 | 2 |

The additional, off-set, spread values should have an effect on both pre-trade prices and post-trade prices. The price information is a very common field in a trading Application Program Interface (API) and it exists in most of the messages going in and out from the electronic trading system.

When generating and distributing the different orderbooks as shown above to the respective users a separate message to each type of firm must be generated. In the example above this would mean that the central system would need to generate 3 separate message flows, one for each firm.

Three separate messages are sent out from the system; one unique message for each type of user.

A typical trading system distributes a lot of different messages containing price information of some kind. With the solution described above it would mean that every message would need to be generated and distributed in three different ways which would have a major impact on both system performance and bandwidth impact on the network. Furthermore every customer type added to the system will add additional load to the system.

It would therefore be preferable to find a solution that requires less messages going out from the system regardless of the number of user types.

Hence, there exist a need for a method and a system that is able to accommodate for different orderbook interfaces for different types of users and at the same time reduce or eliminate the need for use of additional bandwidth resources.

The technology described in this application significantly reduces the amount of data needed to be transmitted from the central system when the central system is connected to users that are trading using different offset spread values.

SUMMARY

It is an object to overcome or at least reduce some of the problems associated with transmission of messages in an electronic trading system as set out above.

This object and others are obtained by the method and system as set out in the appended claims. Thus, one single type of message is distributed to all users connected to the system regardless of the type of user.

A message is then processed by the user in response to a setting in the central system. In particular the message is processed in response to a setting corresponding to the pricing for the user.

In accordance with one embodiment a computerized trading system configured to receive buy and sell trade orders in financial instruments traded in the central trading system from user terminals connected to the central trading system is provided. The user terminals are of at least two types trading in the central system at different off-set spread values and the central trading system further being configured to transmit price information to the at least two types of user terminals. The central system is then configured to transmit price information to the at least two types of user terminals, wherein the central system is configured to transmit a price information message to the at least two types of user terminals in one message being the same for the at least two types of user terminals single message and where the user terminals are configured to display the price information in said price information message including said different off-set spread values. Hereby a reduced number of messages needs to be transmitted in that the user terminals are enabled to convert the single message stream to the correct price information valid for each particular user.

In accordance with one embodiment the system can be configured to transmit post trade messages transmitted from the central system to the individual users as one message per matched trade order.

In accordance with one embodiment the central system can be configured to provide a parameter corresponding to an additional spread value configured for a particular user of the central system exchange.

In accordance with one embodiment the central system can configured to provide the parameter corresponding to an additional spread value upon creation of a session between the user and the central system.

In accordance with one embodiment a user terminal configured to transmit buy and sell trade orders in financial instruments traded in a central trading system is provided. The user terminal is further configured to display price information received from the central system. The user terminal is also configured to add an additional spread value for the particular user terminal to the received price information before it is displayed.

In accordance with one embodiment the user terminal is configured to receive the additional spread value from the central trading system. In accordance with one embodiment the additional spread value is received upon creation of a session between the user and the central system.

In accordance with one embodiment a reference data model is used in the central system enabling the exchange to configure a parameter corresponding to an Additional Spread value for each user or customer in the system. In accordance with one embodiment the parameter can also be set differently for different financial instruments traded in the central system.

The technology described in this application also extends to methods for operating the computer system and user terminals in accordance with the above. The technology described in this application also extends to computer program product enabling a computer to execute the method of operating the computer system and user terminals.

The settings in the central system can be distributed to the user upon creation of a session between the user and the central system.

DETAILED DESCRIPTION

Figure 1:
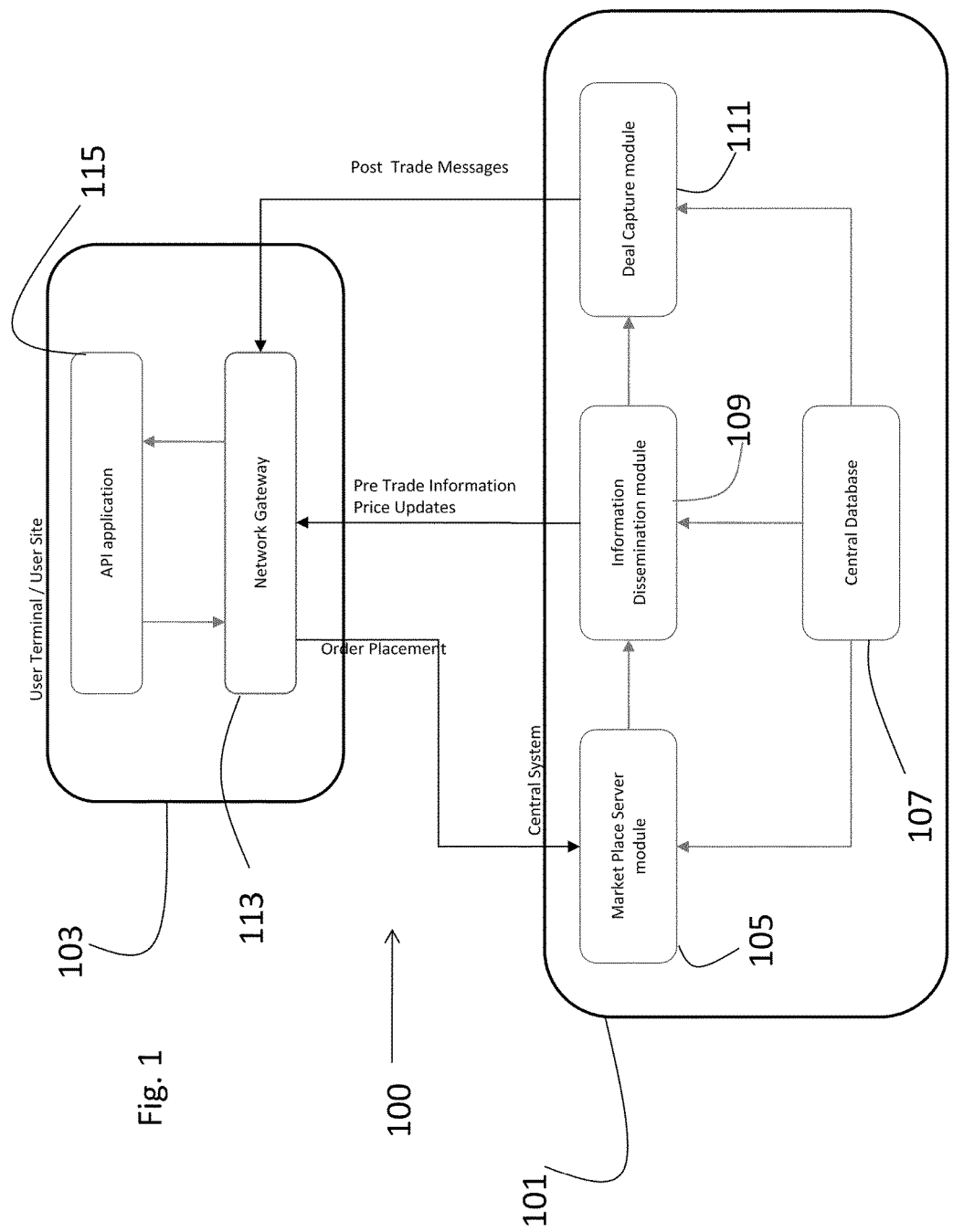
FIG. 1 is a view illustrating an exemplary computerized trading system.

In FIG. 1 a view illustrating an exemplary computerized trading system 100 is depicted. The system 100 comprises a central system 101 connected to a number of user terminals/user sites 103. In FIG. 1 only one user terminal 103 is depicted but it is understood that many, typically a large number of, user terminals are connected to the central system 101. The central system 101 is configured to automatically match trading orders received from the users and to output the result as a deal including, at least two, matched trade orders. The trade orders received from the user terminals 103 are received by a market place server module 105 configured to receive orders using suitable software stored on a memory and processed by a processor associated with the market place server module. In a typical configuration the market place server serves the received trade orders in accordance with a first come first serve manner such that as soon an order is received that matches an earlier received order that is stored in an orderbook the matching orders are matched, and subsequently, a deal of the matching orders is formed. If the received order cannot immediately match an existing order in the orderbook, then the received order is placed in the orderbook for matching against subsequently received orders provided that the order is of a type that allows for the order to be stored in the orderbook. The orderbook information can for example be stored in a common database 107 accessible by several computer-based processing modules of the central system.

When an order is received by the central system, the system is configured to disseminate the new information to all users. The dissemination of information is performed by an information dissemination module 109 comprising a memory storing suitable software which can be executed using a processor associated with the information dissemination module 109. The information dissemination module can also be connected to the common database 107 for receiving information therefrom and to the market place server 105 for receiving information therefrom too. For example, the information dissemination module can receive orderbook information from the common data base and information relating to matched orders from the market place server. As is explained above in some scenarios not all users trade at the same price. Instead some users may trade at a spread value offset. The information dissemination module 109 is configured to transmit information to the user terminals 103 without any spread value offset. Instead the user terminals/user sites are configured to automatically re-calculate the information received from the central system to accurately reflect prices including the correct spread value. This can be implemented in various ways as will be described below. The central system 101 can also comprise a deal capture module 111. The deal capture module can typically comprise a memory storing suitable software which can be executed using a processor associated with the deal capture module 111. The deal capture module 111 can also be connected to the common database 107 for receiving information therefrom and to the market place server 105. When a deal is made by matching at least two trade orders in the market place server the matched trade orders are formed into a deal in the deal capture module. When the deal is formed in the deal capture module 111 a post trade message can be sent to the parties having sent the matched trade orders to the central system. In one embodiment the post trade messages transmitted from the central system to the individual users are sent as individual messages, i.e. one message per matched trade order. The post trade message can then be sent including all fees and spread offset values and there is no need for the user to further process the information to generate the price of the matched trade order.

The user terminal 103 can typically comprise a gateway 113 forming the transmitting/receiving interface via which trade orders are transmitted to the central system 101 and messages such as pre-trade and post trade messages are received from the central system. In addition the user can comprise an API application 115 that is configured to automatically re-calculate the information received from the central system to accurately reflect prices including the correct spread value using a processor of the user terminal 103.

Figure 2:
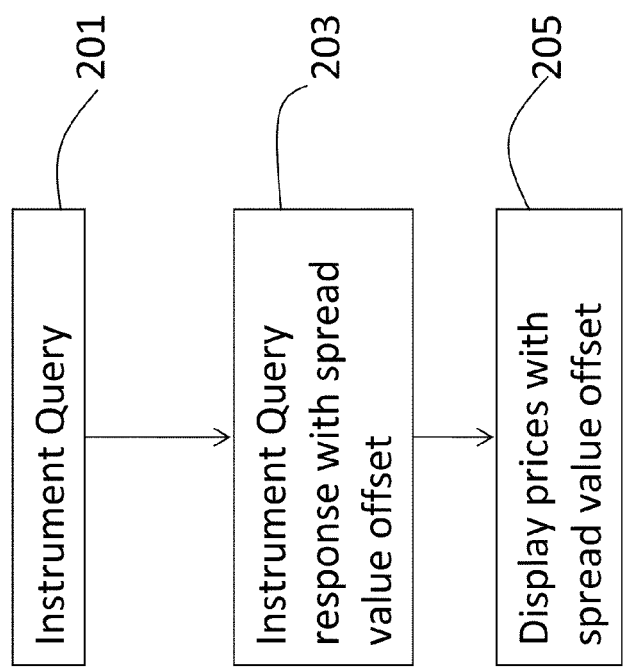
FIG. 2 is a flow chart illustrating some procedural steps performed in accordance with a first example embodiment.

In FIG. 2 a flow chart illustrating some procedural steps performed when disseminating data from the central system 101 is shown. First in a step 201, the user terminal 103 provides an Application Program Interface (API) query that will be used by the user application at login to download a list of all securities/security groups (depending on granularity on the configuration) or other financial instruments traded in the central system. Next in a step 203 an answer comprising a parameter or a set of parameters will be provided. The query answer can for example comprise, for each instrument/group of instruments, a parameter corresponding to an additional offset spread value configured for that user of the central system exchange or if different additional spread values are to be used for different traded instruments or groups of instruments a set of parameters can be provided. The trading application will then in a step 205 apply these spread values received for the central system to modify published prices before they are displayed on the screen of the trader. As a result a trader trading in the central system will see the prices he will trade on including the additional spread value. The central system will then only need to distribute real market prices in the API and there is no need to duplicate messages over the API.

In a second embodiment a modified price is distributed via the API. All frontends, including the primary users, are forced to apply the configured spread before it is presented on the screen. In such a scenario the real price is not transmitted over the API. Instead all users need to apply an offset spread value to correctly display the trading price at which that particular user trades in the central system.

Using the method and system as described herein will enable the system to only distribute a single message stream. This will be an efficient solution from a performance and bandwidth perspective. No duplicated price messages will be needed. Secondary customers will be allowed to subscribe to the same messages as the primary clients. However, before a distributed price is presented to an end user it will, depending on the type of end user, be modified by the user application. The modification can differ depending on what type of price message that is received by the application and how the instrument is traded. In accordance with one embodiment Post-trade messages are handled differently than pre-trade messages. Thus, in one embodiment post trade messages transmitted from the central system to the individual users are sent as individual messages, i.e. one message per matched trade order. The post trade message can then be sent including all fees and spread offset values and there is no need for the user to further process the information to generate the price of the matched trade order. Below an exemplary setting is described in more detail.

Pre-Trade Messages

All pre-trade messages contain information about prices related to an order book side, i.e. a bid side or an offer side. The user application must therefore be coded to look on both the price and the order book side to determine which value that shall be presented in the Graphical User Interface (GUI). The instruments ranking type will also have an impact on this procedure. The user application can be configured to perform the following actions:

For instruments traded on price with a first, non-inverted (normal), ranking:
  Add the spread value to prices related to the offer side.
  Subtract the spread value from prices related to the bid side.

For instruments traded on yield/rate with a second, inverted, ranking:
  Add the spread value to prices related to the bid side.
  Subtract the spread value from prices related to the offer side.

The user application can also be configured to convert prices that have been specified by a user before the values are sent to the central system via the API. For example when a user generates an order to be transmitted to the central system, the user will specify a price that corresponds to the prices that he sees on the screen. This value is then modified in the user terminal based on the offset spread value before they are specified in the order transaction. The logic specified above can then be applied in a reverse mode.

The technology as described herein can advantageously be implemented using computer program software stored on a memory and loadable into a computer so that when the computer executes the program segments of the software the computer is caused to execute the method steps as described above.

Using the method and system as described herein significantly reduces the amount of data needed to be transmitted from the central system when the central system is connected to users that are trading using different offset spread values.

We claim:
1. A system, comprising:
  a trading exchange including:
    at least one memory; and
    at least one processor;
    wherein the at least one memory is configured to store software for a market place server and for an information dissemination server; and
    wherein the at least one memory and at least one processor are configured to perform operations that include:
      communicating with a plurality of user terminals via a network, wherein the user terminals include a first user terminal of a first type and a second user terminal of a second type, wherein the second type and the first type are different, and wherein the first user terminal is operated on behalf of a first user and the second user terminal is operated on behalf of a second user;
      receiving, from the first and second user terminals and via the network, pre-trade information including an order related to a bid order book side or an offer order book side for a financial instruments;
      storing the pre-trade information including the orders related to the bid order book side and offer order book side for the financial instruments in an order book database;

transmitting, via the network and to the first user terminal, first offset information that indicates a first price offset value associated with a price of a financial instrument;
transmitting, via the network and to the second user terminal, second offset information that indicates a second price offset value associated with the price of the financial instrument, wherein the second price offset value and the first price offset value are different; and
transmitting, via the network after transmitting the first and second offset information, a single message to the first user terminal and second user terminal, wherein:
(i) the single message indicates a market price for a financial instrument,
(ii) the single message as received by the first user terminal has the same content as the single message as received by the second user terminal, and
(iii) the single message does not include the first price offset value or the second price offset value;
transmitting, via the network to the first and second user terminals, post-trade information different from the single message that indicates a match between the bid order book side or an offer order book side orders;
the first user terminal configured to:
transmit the pre-trade information including one of the order related to the bid order book side or the offer order book side for the financial instrument;
receive the first price offset value;
receive the single message after receiving the first price offset value;
modify the market price for the financial instrument using the first price offset value to obtain a first actual price for the financial instrument;
receive the post-trade information;
and
the second user terminal configured to:
transmit the pre-trade information including the other of the order related to the bid order book side or the offer order book side for the financial instrument;
receive the second price offset value;
receive the single message after receiving the second price offset value;
modify the market price for the financial instrument using the second price offset value to obtain a second actual price for the financial instrument; and
receive the post-trade information.

2. The system according claim 1, wherein the operations further include:
receiving, from the first user terminal, a query that requests the first price offset value; and
wherein the at least one memory and at least one processor are further configured to transmit the first price offset value to the first user terminal in response to the query.

3. The system according to claim 1, wherein the first and second price offsets values are spread offset values.

4. The central trading system according to claim 3, wherein the query is transmitted from the first user terminal when the first user logs in to a trading application at the first user terminal.

5. The system according to claim 1, wherein the first and second user terminals each include a gateway and an application programming interface (API).

6. The central trading system according to claim 1, wherein the first and second price offsets values are spread offset values.

7. A method, comprising:
at a central trading system:
communicating with a plurality of user terminals via a network, wherein the user terminals include a first user terminal of a first type and a second user terminal of a second type;
receiving, from the first and second user terminals and via the network, pre-trade information including an order related to a bid order book side or an offer order book side for a financial instruments;
storing the pre-trade information including the orders related to the bid order book side and offer order book side for the financial instruments in an order book database;
transmitting, via the network and to the first user terminal, first offset information that indicates a first price offset value; and
transmitting, via the network and to the second user terminal, second offset information that indicates a second price offset value; and
transmitting, via the network after transmitting the first and second offset information, a single message to the first user terminal and second user terminal, wherein:
(i) the single message indicates a market price for a financial instrument,
(ii) the single message as received by the first user terminal has the same content as the single message as received by the second user terminal, and
(iii) the single message does not include the first price offset value or the second price offset value;
transmitting, via the network to the first and second user terminals, post-trade information different from the single message that indicates a match between the bid order book side or an offer order book side orders;
at the first user terminal:
transmitting the pre-trade information including one of the order related to the bid order book side or the offer order book side for the financial instrument;
receiving the first price offset value;
receiving the single message after receiving the first price offset value;
modifying the market price for the financial instrument using the first price offset value to obtain a first actual price for the financial instrument;
receiving the post-trade information; and
at the second user terminal:
transmitting the pre-trade information including the other of the order related to the bid order book side or the offer order book side for the financial instrument;
receiving the second price offset value;
receiving the single message after receiving the second price offset value;
modifying the market price for the financial instrument using the second price offset value to obtain a second actual price for the financial instrument; and
receiving the post-trade information.

8. The method according to claim 7, further comprising:
at the first user terminal:
transmitting a query to the central trading system, the query indicating a request for the first price offset value.

9. The method according to claim 8, wherein the transmitting the query to the central trading system is performed at the first user terminal in response to a user of the first user terminal logging in to a trading application at the first user terminal.

10. The method according to claim 7, wherein:
the market price for the financial instrument is an offer price; and
the modifying the market price for the financial instrument using the first price offset value to obtain the first actual price includes the first user terminal adding the first price offset value to the market price.

11. The method according to claim 7, wherein:
the market price for the financial instrument is a bid price; and
the modifying the market price for the financial instrument using the first price offset value to obtain the first actual price includes the first user terminal subtracting the first price offset value from the market price.

12. The method according to claim 7, wherein the same message indicates a published price for a financial instrument.

13. The method according to claim 7, wherein the first and second price offsets values are spread offset values.

14. The central trading system according to claim 13, wherein:
the market price for the financial instrument is an offer price; and
the first offset value is usable by the first user terminal to obtain the first actual price offered via an addition of the first offset value to the market price.

15. The central trading system according to claim 13, wherein:
the market price for the financial instrument is a bid price; and
the first offset value is usable by the first user terminal to obtain the first actual price offered via a subtraction of the first offset value from the market price.

16. A central trading system, comprising:
at least one memory; and
at least one processor;
wherein the at least one memory is configured to store software for a market place server and for an information dissemination server; and
wherein the at least one memory and at least one processor are configured to perform operations that include:
communicating with a plurality of user terminals via a network, wherein the user terminals include a first user terminal of a first type and a second user terminal of a second type, wherein the second type and the first type are different, and wherein the first user terminal is operated on behalf of a first user and the second user terminal is operated on behalf of a second user;
receiving, from the first and second user terminals and via the network, pre-trade information including an order related to a bid order book side or an offer order book side for a financial instrument;
storing the pre-trade information including the orders related to the bid order book side and offer order book side for the financial instrument in an order book database;
transmitting, via the network and to the first user terminal, first offset information that indicates a first price offset value associated with a price of a financial instrument;
transmitting, via the network and to the second user terminal, second offset information that indicates a second price offset value associated with the price of the financial instrument, wherein the second price offset value and the first price offset value are different; and
transmitting, via the network after transmitting the first and second offset information, a single message to the first user terminal and second user terminal, wherein:
(i) the single message indicates a market price for a financial instrument,
(ii) the single message as received by the first user terminal has the same content as the single message as received by the second user terminal, and
(iii) the single message does not include the first price offset value or the second price offset value;
transmitting, via the network to the first and second user terminals, post-trade information different from the single message that indicates a match between the bid order book side or an offer order book side orders;
wherein:
the first offset value is usable by the first user terminal to:
transmit the pre-trade information including one of the order related to the bid order book side or the offer order book side for the financial instrument;
receive the first price offset value;
receive the single message after receiving the first price offset value;
modify the market price for the financial instrument using the first price offset value to obtain a first actual price for the financial instrument;
receive the post-trade information; and
the second offset value is usable by the second user terminal to:
transmit the pre-trade information including the other of the order related to the bid order book side or the offer order book side for the financial instrument;
receive the second price offset value;
received the single message after receiving the second price offset value;
modify the market price for the financial instrument using the second price offset value to obtain a second actual price for the financial instrument; and
receive the post-trade information.

17. The central trading system according claim 13, wherein the operations further include:
receiving, from the first user terminal, a query that requests the first price offset value; and
wherein the at least one memory and at least one processor are further configured to transmit the first price offset value to the first user terminal in response to the query.

* * * * *